United States Patent
Lendi

(10) Patent No.: US 10,512,953 B2
(45) Date of Patent: Dec. 24, 2019

(54) PIPE CLEANING DEVICE WITH CAMERA

(71) Applicant: Enz Technik AG, Giswil (CH)

(72) Inventor: Christoph Lendi, Giswil (CH)

(73) Assignee: ENZ TECHNIK AG, Giswil (CH)

( * ) Notice: Subject to any disclaimer, the term of this patent is extended or adjusted under 35 U.S.C. 154(b) by 26 days.

(21) Appl. No.: 15/648,640

(22) Filed: Jul. 13, 2017

(65) Prior Publication Data

US 2018/0015512 A1  Jan. 18, 2018

(30) Foreign Application Priority Data

Jul. 14, 2016  (CH) ...................... 0907/16

(51) Int. Cl.
*B08B 9/049* (2006.01)
*F16L 55/36* (2006.01)
(Continued)

(52) U.S. Cl.
CPC ............ *B08B 9/0495* (2013.01); *B08B 13/00* (2013.01); *E03F 9/005* (2013.01); *F16L 55/36* (2013.01);
(Continued)

(58) Field of Classification Search
CPC .................... F16L 55/36; F16L 55/38
(Continued)

(56) References Cited

U.S. PATENT DOCUMENTS 3,525,112 A * 8/1970 Masters .................. E03F 9/002
  15/104.12
4,107,738 A * 8/1978 Van Norman ............ E03F 7/00
  348/84

(Continued)

FOREIGN PATENT DOCUMENTS

CA  1239761 A  *  8/1988  ............... B05B 3/06
JP  02222762 A  *  9/1990  ........... B08B 9/0497
(Continued)

OTHER PUBLICATIONS

JPH02222762—Machine Translation (Year: 1990).*
(Continued)

*Primary Examiner* — Marc Lorenzi
(74) *Attorney, Agent, or Firm* — Paul D. Bianco; Gary S. Winer; Fleit Intellectual Property Law

(57) ABSTRACT

A pressure medium-operated pipe cleaning device for streak-free cleaning of the pipe and duct wall and simultaneously a video recording of the entire cleaning process. The device includes a nozzle module and a camera module. The nozzle module includes a plurality of thrusters and a plurality of cleaning nozzles, and the camera module has at least one camera, an illuminating device, control electronics, a memory, a transmitter and an accumulator, so that the camera module can be controlled from outside by the control electronics. The nozzle module and camera module separately designed in terms of location and construction, and mounted on a carriage spaced linearly apart from each other in the direction of a longitudinal axis by a distance, wherein a stator part has the thrusters of the nozzle module and the camera module is rotationally and linearly immovably fastened to the carriage, while the rotor part on which the plurality of cleaning nozzles are arranged can be rotated around the longitudinal axis.

8 Claims, 2 Drawing Sheets

(51) Int. Cl.
*B08B 13/00* (2006.01)
*H04N 5/225* (2006.01)
*E03F 9/00* (2006.01)
*F16L 55/40* (2006.01)
*F16L 101/12* (2006.01)

(52) U.S. Cl.
CPC ......... *H04N 5/2252* (2013.01); *H04N 5/2253* (2013.01); *H04N 5/2256* (2013.01); *H04N 5/2257* (2013.01); *B08B 2209/032* (2013.01); *B08B 2209/04* (2013.01); *F16L 55/40* (2013.01); *F16L 2101/12* (2013.01); *H04N 2005/2255* (2013.01)

(58) Field of Classification Search
USPC .................. 134/166 C, 167 C, 168 C, 169 C
See application file for complete search history.

(56) References Cited

U.S. PATENT DOCUMENTS

| | | | | |
|---|---|---|---|---|
| 5,942,044 A | * | 8/1999 | Piguillet | B08B 9/0495 134/21 |
| 6,111,600 A | * | 8/2000 | McLeod | E03F 7/12 348/84 |
| 6,138,697 A | * | 10/2000 | Horger | B08B 9/0495 134/167 C |
| 9,962,746 B2 | * | 5/2018 | Bauer | B08B 9/0321 |
| 2011/0203394 A1 | * | 8/2011 | Tinlin | B08B 9/0495 73/866.5 |

FOREIGN PATENT DOCUMENTS

| | | | | |
|---|---|---|---|---|
| JP | 11114513 A | * | 4/1999 | ............ B08B 9/0495 |
| KR | 2006102573 A | * | 9/2006 | |
| KR | 100749081 B1 | * | 8/2007 | |

OTHER PUBLICATIONS

JPH11114513—Machine Translation (Year: 1999).*
KR100749081—Machine Translation (Year: 2007).*
KR20060102573—Machine Translation (Year: 2006).*

* cited by examiner

PIPE CLEANING DEVICE WITH CAMERA

TECHNICAL FIELD

The present invention describes a pressure medium-operated pipe cleaning device, comprising a nozzle module and a camera module, wherein the nozzle module comprises a plurality of thrusters and a plurality of cleaning nozzles, and the camera module has at least one camera, an illuminating device, control electronics, a memory, a transmitter and an accumulator, so that the camera module can be controlled from outside by accessing the control electronics.

PRIOR ART

Pressure medium-operated pipe cleaning devices, which operate by means of a pressure medium or cleaning fluid, as a rule water, under pressures of several bar up to several hundred bar, have been known from prior art for quite some time. Such pipe cleaning devices can be used to clean pipes and ducts in industrial plants, and duct installations in both the public and private sectors.

In order to check the cleaning results, companies suggest checking the cleaned pipes and ducts with a camera, which in terms of time takes place after cleaning. A camera module is here guided through the cleaned pipe or duct after cleaning, wherein pictures of the cleaned inner walls are taken, and the cleaning result is documented. Naturally, this additional step is associated with extra costs, which the goal would be to minimize.

Accordingly, the manufacturers of pipe cleaning devices have gone about equipping pressure medium-operated pipe cleaning devices directly with a camera, so that a video of the cleaning result can be made during or shortly after cleaning. Such pipe cleaning devices were equipped with a camera module, wherein power supply and data transmission for the camera module had to be optimized before the desired videos could now be made in the pipe or duct. Non-rotating nozzle modules of the pipe cleaning devices with integrated camera module were drawn upon so as not to disrupt the video recording. While the latter allow a desired video recording, the cleaning effect of these pipe cleaning devices is inadequate.

The expert has realized that rotating pipe cleaning devices must be used to achieve a desired cleaning effect. A camera module was here integrated in the rotating pipe cleaning device so as to co-rotate. However, the rotation of the pipe cleaning device with integrated camera module hampers the recording of video images. Attempts were made to resolve this problem with technically complicated solutions, which synchronize the image recording with the velocity, so as to achieve a still video image. Apart from the disruptive additional technical outlay, the resulting video quality is disadvantageous.

DESCRIPTION OF THE INVENTION

The object of the present invention is to provide a pipe cleaning device that has optimal cleaning properties with streak-free cleaning of the pipe and duct wall, while simultaneously allowing a video recording of the entire cleaning process, which is to be achieved with a low technical outlay at low adjustment costs.

A flexible pipe cleaning adjusted to the intended application with simultaneous video control is made possible by modularly configuring the pipe cleaning device and separating a camera module and rotatable nozzle module, as well as spacing them linearly apart.

Also achieved is a robust pipe cleaning device, which can be pressurized with high pressures, and cleans reliably even under extreme conditions, wherein the nozzle module and camera module are afforded with mechanically sufficient protection.

BRIEF DESCRIPTION OF THE FIGURES

Additional features, details and advantages of the invention are indicated in the following description of preferred embodiments of the invention, as well as in the drawings. Shown on:

FIG. 1 is a perspective view of a pipe cleaning device, while

FIG. 3 presents a side view of the pipe cleaning device, while

DESCRIPTION

Figure 1:
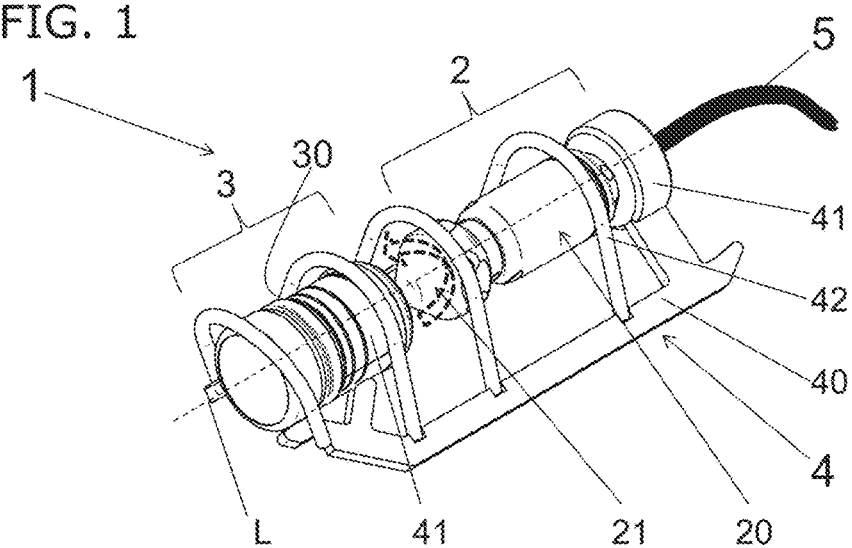
Figure 2:
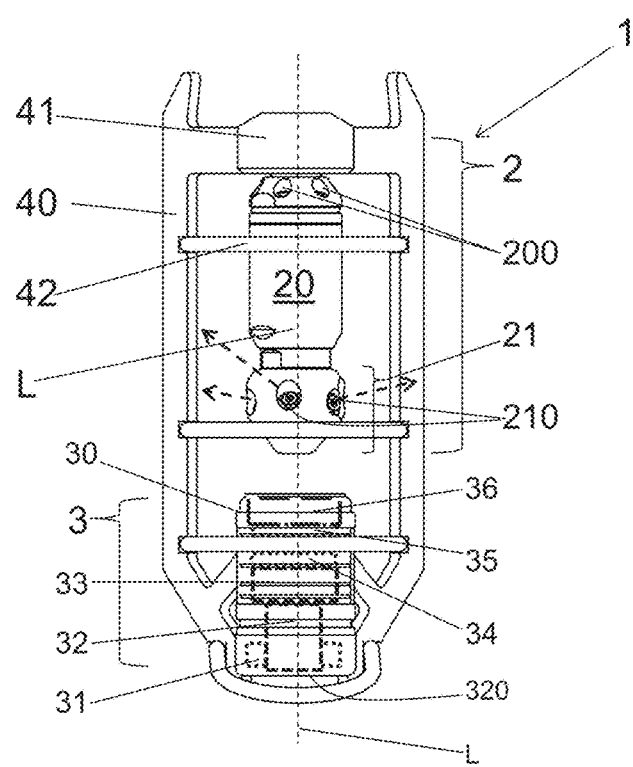
FIG. 2 presents a top view of the pipe cleaning device according to FIG. 1.

Described is a pipe cleaning device 1 comprising a nozzle module 2 and a camera module 3, which are mechanically fastened to a carriage 4 spaced apart from each other in the direction of longitudinal axis L. The carriage 4 is here understood to mean a holding device for fastening the components, which facilitates a linear movement of the pipe cleaning device 1.

The nozzle module 2 comprises a rotationally unmovable stator part 20 and a rotor part 21, which can be rotated around the longitudinal axis L of the nozzle module 2 by supplying a cleaning fluid. The cleaning fluid, as a rule fresh water or recycled water, is introduced by means of a high-pressure line 5 into the stator part 20 under fluid pressures of 50 bar to several hundred bar, or even 1000 bar.

The stator part 20 of the nozzle module 2 and a housing 30 of the camera module 3 are spaced apart from each other in the direction of the longitudinal axis L and each rotationally and linearly immovably fastened to the carriage by means of a retaining ring 41 or retaining sleeve 41. A gap is arranged between the rotor part 21 and housing 30 of the camera module 3. As denoted by a dashed arrow, the rotor part 21 can rotate around the longitudinal axis L.

The carriage 4 has at least one runner 40, to which the retaining rings 41 or retaining sleeves 41 are directly or indirectly fastened. Two runners 40 are here aligned in roughly a v-shape relative to each other. A frontal strut and an inlet strut run on each runner 40 to the connecting retaining ring 41 or retaining sleeve 41. The retaining rings or sleeves 41 are welded to the carriage 4 or runners 40. The nozzle module 2 and camera module 3 are preferably tightly screwed into the retaining ring or sleeve 41 with screws. As a consequence, the nozzle module 2 and camera module 3 can be interchangeably connected with the carriage 4. A simple replacement is of interest for maintenance purposes or in repair cases.

Figure 4:
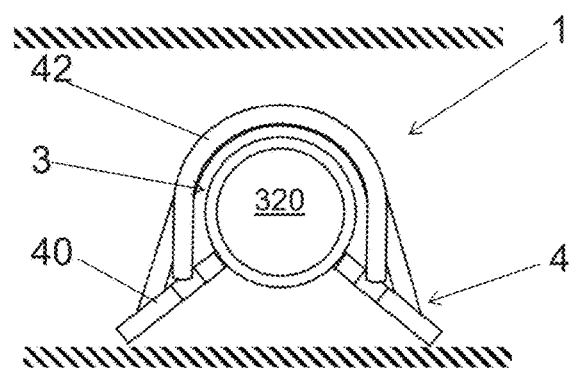
FIG. 4 presents a front view of the pipe cleaning device, with a view of the camera module.

A plurality of protective brackets 42 are provided, which span the runners 40, the nozzle module 2 and the camera module 3, so that contact between these components and a duct or pipe wall can be prevented. The protective brackets 42 here project from the carriage 4, and extend over the protective glass side of the camera module 3 in the longitudinal direction over the camera module 3 and the nozzle module, wherein the protective brackets 42 are spaced apart from the modules. The runners 40 space the modules 2, 3 apart from the floor on the underside of the carriage 4, as evident from FIG. 4. For example, the protective brackets 42 can be welded to the runners 40 or hooked into suitable cutouts on the runners 40, and held clamped in the runners 40 under a stress. The protective brackets 42 are preferably bent without edges, so that no disruptive edges can become snagged on the inner wall of the pipe or duct.

The objective was to develop a robust, rotating pipe cleaning device 1 having a desired cleaning and rinsing performance. A rotating drive of the nozzle module 2 or rotor part 21 is absolutely necessary for this purpose.

In order to advance the pipe cleaning device 1, a plurality of thrusters 200 are arranged on the stator part 20, opposite the camera module 3. These thrusters 200 ensure a linear advancement of the pipe cleaning device 1 in the direction of the longitudinal axis L through the pipe to be cleaned. The thrusters 200 are aligned at a thruster angle of greater than zero relative to the longitudinal axis L. The flow rate or pressure of the cleaning fluid is optimized for a maximum advance.

A plurality of cleaning nozzles 210 is arranged on the rotor part 21, which impart rotation to the nozzle module 2. The cleaning nozzles 210 are directed radially away from the longitudinal axis L of the nozzle module 2, so that a high-speed rotation of the rotor part 21 around the longitudinal axis A can be achieved through pressurization with the existing fluid. The cleaning nozzles 210 are inclined corresponding to the longitudinal axis L. In addition, the cleaning nozzles 210 release cleaning jets that hit the inner walls of the ducts or pipes at varying angles. The cleaning nozzles 210 are slightly offset in the direction of the longitudinal axis A, and have varying cleaning nozzle angles, so that the exiting cleaning jets hit the duct or pipe inner wall slightly offset along the longitudinal axis A. This yields a maximum cleaning effect. A streak-free cleaning of the inner walls can be achieved.

While the rotor part 21 rotates around the longitudinal axis L and the stator part 20 is non-rotatably and immovably fastened to the carriage 4, the camera module 3 is also immovably and non-rotatably mounted on the carriage 4.

The housing 30 of the camera module 3 incorporates an illuminating device 31, a camera 32, control electronics 33, a memory 34, a transmitter 35 and an accumulator 36. The housing 30 is terminated by a protective glass 320, which protects the camera 32 during operation, and does not scratch. The protective glass 320 preferably consists of sapphire glass. The illuminating device 31 can here consist of LED's, which enable strong illumination with little energy consumption. The lamps of the illuminating device 31 are preferably arranged in a ring around the camera 32, directly behind the protective glass. The control electronics 33 are used to control the illuminating device 31, memory 34, and transmitter 35. The pictures taken by the camera 32 can be stored in the memory 34, and wirelessly transmitted from the duct or pipe by transmitters 35. Since wireless data transmission is provided and power is supplied to the components of the camera module 3 via an accumulator 36, no disruptive cables need be installed, resulting in an extremely robust pipe cleaning device 1.

A user can use a mobile device to operate the camera module 3 or control electronics 33 from outside, and check the current cleaning process with the camera 32. The recorded videos can be permanently stored in the memory 34, so that the recorded pictures can also be read out even following the cleaning process, after the pipe cleaning device 1 has been removed from the pipe or duct.

Figure 3:
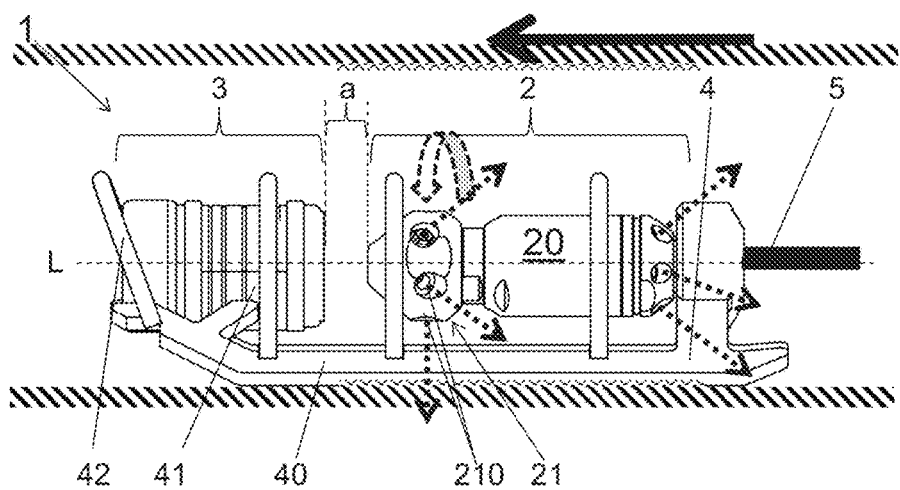

Visible in the side view according to FIG. 3 in the direction of the longitudinal axis L is a distance a between the nozzle module 3 and the camera module 3. The camera module 3 placed upstream in the longitudinal direction, the split configuration of the pipe cleaning device 1 with a separate nozzle module 2 and camera module 3, and the linear spacing between the nozzle module 2 and camera module 3 allow the nozzle module 2 to be equipped with a rotatable rotor part 21, so that an optimized cleaning performance and simple recording of videos can be achieved.

During operation, the pipe cleaning device 1 is slipped into a duct or pipe, and the nozzle module 2 is then exposed to a cleaning fluid. The stator part 20 uses thrusters 200 to linearly advance the pipe cleaning device 1. The carriage 4 is here linearly moved through the pipe product, as indicated on FIG. 3 by the solid arrow. The cleaning fluid is introduced into the nozzle module 2 by way of a high-pressure line terminal.

Stator cleaning nozzles can optionally also be arranged on the stator part 20, which additionally deliver cleaning jets directed radially outwardly away from the longitudinal axis L. The rotating rotor part 21 guides the liquid jets out of the cleaning nozzles 210 along the inner wall of the pipe or duct, so that a streak-free cleaning of the inner walls can be achieved. The areas hit by the cleaning liquid jets are depicted with jagged lines on FIG. 3.

The rotationally immovable camera module 3 can record video images in the cleaning process, spaced apart from the nozzle module 2, as adjustable by control electronics 33. These videos can be stored with memories 34 or transmitted to a mobile device, in particular a smartphone, by a transmitter 35 able to use a known radio transmission technology. The camera module 3 is controlled via the control electronics 33 with a mobile device. Control with a mobile device requires that a mobile device and pipe cleaning device 1 or camera module 3 be "paired" in a first step, which refers to establishing the initial connection.

As evident from the top view of the pipe cleaning device 1 from the camera module side on the camera module 3, the protective brackets 42 envelop the nozzle module 2 and camera module 3. The protective brackets are screwed or welded to the carriage 4 or the runner(s) 40.

To also ensure video recording capability when rinsing water is in the pipe or duct, the housing 30 can incorporate more than one camera 32 at varying distances to the longitudinal axis L, or a height-adjusting device can be used for the camera 32 or camera module 32, making it possible to vary the distance between the camera 32 or camera module 3 and the runners 40.

The distance a between the camera module 3 and nozzle module 2 should be as small as possible, so that no rocks or roots can get jammed between the rear wall of the housing 30 and rotor part 21.

In order to create a cleaning effect in the direction of the longitudinal axis L at the height of the camera module 3, at least one cleaning nozzle 210 can be directed toward the front in the direction of the camera module 3.

The advantage to the wireless configuration of the pipe cleaning device 1 or camera module 3 is that it precludes an entanglement or destruction of a bothersome cable during operation. The camera module 3 is supplied with enough energy by the internal accumulator 36, and can be recharged after operation.

In order to avoid dismantling the camera module 3 with the accumulator drained, the camera module 3 can be connected with an external charging station. The latter can either be operatively connected with contacts on the housing 30 of the camera module 3, or the accumulator is wirelessly charged, as a rule via induction.

The wireless data transmission of control signals and video data can take place based on the WLAN or Wi-Fi standard. It is here provided that the data be loaded onto a tablet computer or a smartphone through wireless data transmission or stored in a cloud. To save on storage space, the data would then be deleted from the memory 34. The nozzle functions, for example turning on and off the illuminating device 31, can also be performed via the tablet computer or smartphone, with video recording also being controlled in this way.

REFERENCE LIST

1 Pipe cleaning device
2 Nozzle module
20 Stator part
200 Thruster
   High-pressure line terminal
   Stator cleaning nozzle
21 Rotor part
210 Cleaning nozzle
3 Camera module
30 Housing
31 Illuminating device
32 Camera
320 Protective glass
33 Control electronics
34 Memory
35 Transmitter
36 Accumulator
4 Carriage (simple, mechanically stable, screw-on module)
40 Runner
41 Retaining ring (or sleeve)
42 Protective bracket
L Longitudinal axis
a Distance
5 High-pressure line

The invention claimed is:

1. A pressure medium-operated pipe cleaning device, comprising a nozzle module and a camera module, wherein the nozzle module comprises a stator part with a plurality of thrusters propelling the device in a travel direction and a rotor part placed in front of the stator part relative to the travel direction, the rotor part having a plurality of cleaning nozzles, and the camera module has at least one camera, an illuminating device, control electronics, a memory, a transmitter and an accumulator, so that the camera module is controlled from outside by accessing the control electronics,
   wherein the nozzle module and camera module are separately designed in terms of location and construction, and mounted on a carriage spaced linearly apart from each other in the direction of a longitudinal axis of the device by a distance, wherein the stator part and the camera module are rotationally and linearly immovably fastened to the carriage, while the rotor part is rotatable around the longitudinal axis, and wherein the carriage, the nozzle module and camera module are aligned along the longitudinal axis.

2. The pressure medium-operated pipe cleaning device according to claim 1, wherein the camera module is placed in front of the nozzle module relative to the travel direction.

3. The pressure medium-operated pipe cleaning device according to claim 1, wherein a plurality of protective brackets are arranged on the carriage, at least partially enveloping the nozzle module and the camera module.

4. The pressure medium-operated pipe cleaning device according to claim 1, wherein the carriage has a retaining ring or a retaining sleeve for fastening the nozzle module and a retaining ring or a retaining sleeve for fastening the camera module.

5. The pressure medium-operated pipe cleaning device according to claim 3, wherein the protective brackets are screwed or welded to the carriage.

6. The pressure medium-operated pipe cleaning device according to claim 1, wherein the carriage has at least one runner.

7. The pressure medium-operated pipe cleaning device according to claim 6, wherein the carriage has two runners, which point away from the longitudinal axis at varying angles, thereby imparting a V-shaped cross section to the carriage.

8. The pressure medium-operated pipe cleaning device according to claim 4, wherein the retaining ring or retaining sleeve for fastening the nozzle module and the retaining ring or retaining sleeve for fastening the camera module are screwed or welded to the carriage.

* * * * *